US012287778B2

(12) United States Patent
Helin et al.

(10) Patent No.: US 12,287,778 B2
(45) Date of Patent: Apr. 29, 2025

(54) AGENT PRESENCE SERVICE FOR A CLOUD-BASED CONTACT CENTER PLATFORM

(71) Applicant: Twilio Inc., San Francisco, CA (US)

(72) Inventors: Charlie Helin, Murrieta, CA (US); Justin Kurtz, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 76 days.

(21) Appl. No.: 18/198,804

(22) Filed: May 17, 2023

(65) Prior Publication Data

US 2024/0386012 A1  Nov. 21, 2024

(51) Int. Cl.
*G06F 16/23* (2019.01)
*G06F 12/0864* (2016.01)

(52) U.S. Cl.
CPC ...... *G06F 16/2379* (2019.01); *G06F 12/0864* (2013.01)

(58) Field of Classification Search
CPC .................. G06F 16/2379; G06F 12/0864
See application file for complete search history.

(56) References Cited

U.S. PATENT DOCUMENTS

| 2007/0245409 A1* | 10/2007 | Harris | H04L 67/06 726/5 |
| 2018/0025005 A1* | 1/2018 | Cao | H04L 67/535 707/734 |
| 2022/0075825 A1* | 3/2022 | Helms | H04L 9/3234 707/734 |

FOREIGN PATENT DOCUMENTS

| CN | 110557975 B * | 1/2022 | G06F 16/184 |
| EP | 1372314 B1 * | 7/2008 | H04L 63/0209 |
| WO | WO-2015054877 A1 * | 4/2015 | G06F 12/0864 |
| WO | WO-2021127584 A1 * | 6/2021 | G06F 16/2228 |

* cited by examiner

*Primary Examiner* — Yuk Ting Choi
(74) *Attorney, Agent, or Firm* — Schwegman Lundberg & Woessner, P.A.

(57) ABSTRACT

Described herein is a presence service for a cloud-based contact center platform that is designed to facilitate communications between customers and agents over a variety of communication channels. The presence service is designed with a two-layer architecture. A first layer uses a highly scalable, low latency memory cache to store a high volume of message-related data for tracking the temporal connectivity status of agents. When a connection status change is detected for an agent, the first layer publishes an event message to a queue of a distributed streaming message service. The second layer receives and processes the message to update the online/offline status of the agent in a system of record.

18 Claims, 7 Drawing Sheets

AGENT PRESENCE SERVICE FOR A CLOUD-BASED CONTACT CENTER PLATFORM

TECHNICAL FIELD

This patent application relates to a cloud-based application service that facilitates communications between end-users-such as, customers and contact agents ("agents")—over a variety of communication channels. More precisely, the present patent application relates to a presence service used by the application service to monitor a user's presence and determine the availability of a user to engage with another user via and incoming communication request.

BACKGROUND

In the context of modern communication applications and services (e.g., contact center services or customer interaction services), it is critical that customers not be forced to wait for customer service. Today's customers expect fast and efficient service across multiple channels, including video, voice, messaging (e.g., email, webchat, social media), and more. When customers are forced to wait, it can lead to frustration, dissatisfaction, and even abandonment of a transaction or the business relationship entirely.

In a multichannel or omnichannel contact center, where customer are provided a variety of channels on which to engage, customers may switch between channels as they seek a resolution to a particular issue or request. If a customer is kept waiting on one channel (e.g., voice), they may switch to another channel or even to a competitor, which can lead to lost business and a negative impact on a brand's reputation.

Furthermore, in an omnichannel context, customers may expect seamless transitions between channels, which can be difficult to achieve if they are kept waiting. For example, if a customer starts an interaction on social media and then places a voice call to the contact center, they may expect an agent to have access to their previous interactions and to be able to quickly resolve their issue. If the customer is kept waiting on hold, it can disrupt the continuity of the interaction and lead to a poor customer experience.

Overall, in a modern multichannel or omnichannel contact center, it is essential to prioritize speed and efficiency to ensure that customers are not kept waiting. This can be achieved through careful design of the contact center processes, effective use of technology, and proper training of agents to handle interactions quickly and efficiently across all channels.

BRIEF DESCRIPTION OF THE DRAWINGS

Embodiments of the present invention are illustrated by way of example and not limitation in the figures of the accompanying drawings.

DETAILED DESCRIPTION

Figure 1:
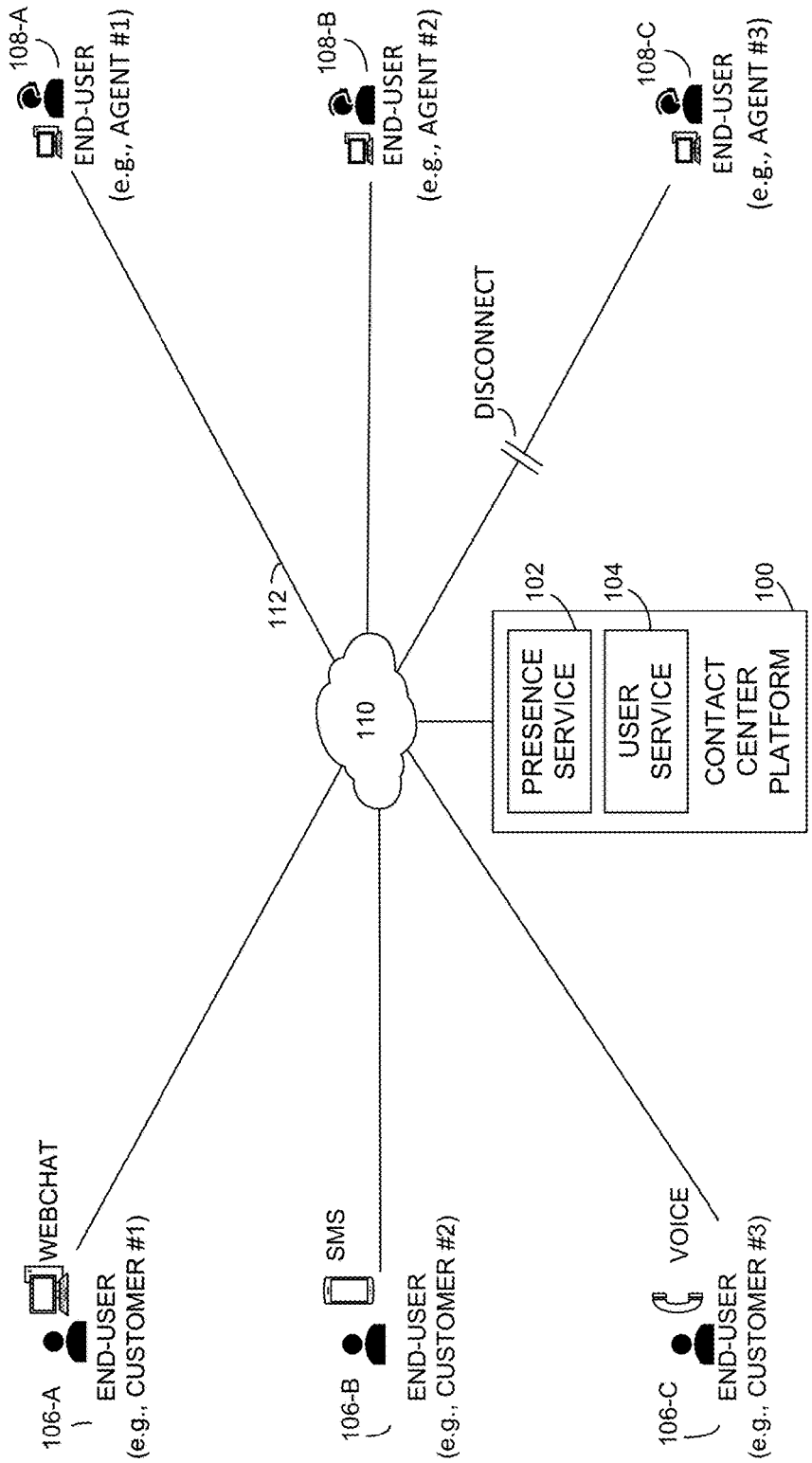
FIG. 1 is a diagram illustrating a network environment including a cloud-based contact center platform, consistent with embodiments of the invention.

Described herein are systems and methods for monitoring the network connectivity status of a client application executing on a client computing device of a user (e.g., such as an agent or customer representative), with respect to a communication application service, such as a contact center service or customer interaction service. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

With conventional call centers or contact centers, customer representatives or contact agents generally work in the same physical space and may share a privately managed network. For example, the computer server or servers that receive and process incoming customer requests may route those incoming requests to agents who are located and working in the same physical space that the servers are located. Accordingly, the likelihood of network problems is drastically reduced when compared with a cloud-based contact center platform, with which agents may be located remotely and connecting to critical services via a less reliable network connection. For instance, one advantage of a cloud-based contact center platform is that agents are able to work from any location, so long as they have network connectivity with the platform. Of course, this means that in many instances, agents may work from home, where their Internet connection may not be as reliable and trustworthy.

One of the most critical services for a contact center platform to ensure that customers are not waiting on an agent is an agent presence system. In the context of a contact center, a presence system is a combination of hardware and software configured to provide a service that tracks and displays the real-time network connectivity status of agents. This network connectivity status is just one of many input signals that may be used by a routing service to route incoming customer interaction requests, whether that be a voice call, a webchat, an SMS message, an email, or some other communication channel. Without knowledge of the connectivity status of each agent, there is a significant risk that an incoming customer request may be routed to an agent who is not available, because the agent is not communicatively coupled, via a network, to the contact center platform. This of course will ultimately lead to a delay in servicing the customer, as the initial request will likely have to time-out before it can be re-routed to an online and available agent.

Therefore, a presence system is one of many technical features that can improve the overall customer experience by helping to reduce the time required to connect a customer with an agent. Many presence systems are designed to operate server-side. For example, with many presence systems, a service or process executing on a server will periodically communicate a message to a client device over a network, requesting that a client application executing on the client device send a reply message to confirm the application has network connectivity.

Implementing a presence system on the server side can have a few drawbacks compared to implementing it on the client side. For example, one drawback is increased server load. Since the presence system is implemented on the server side, it is the server that is responsible for tracking the online status of each client. This can lead to increased server load, especially in large-scale applications with many client applications to track, which can result in performance issues, reliability issues and reduced scalability.

A second draw back to server-side presence systems is network latency. Implementing a presence system on the server side requires frequent network requests between the client and the server to update and query the presence status. This can result in increased network latency, which can impact the responsiveness of the application. Furthermore, when the presence system is implemented on the server side, the server has complete control over the presence status of each client. This can limit the ability of clients to customize or manage their presence status, which can be important in certain applications.

Finally, another draw back to a server-side presence service is increased complexity. Implementing a presence system on the server side can increase the complexity of the server-side codebase, which can make it more difficult to develop, debug, and maintain over time.

Described herein is a software-based presence service for a cloud-based customer interaction system, implemented as a client-side solution. Consistent with some embodiments, the cloud-based contact center platform operates as a Software-as-a-Service ("SaaS") solution. Accordingly, the core functionality of the customer interaction system is provided by software-based services hosted in the cloud and accessed by administrative end-users and agents via the Internet, as opposed to being installed and maintained locally on an enterprise server. Furthermore, the contact center platform is highly configurable by each enterprise customer. For instance, each enterprise customer may configure the customer interaction system m to operate with a variety of different channels (e.g., video, voice, messaging, social media, and others) offered by a variety of different providers. As a cloud-based offering, the customer interaction system is highly scalable, allowing enterprise customers to easily add and remove agents and adjust (e.g., up/down) resources to meet changes in demand.

Consistent with some examples, the entity providing the cloud-based customer interaction system may provide a client software application that each agent can install and use on a client computing device. Alternatively, the customer interaction system may be accessed by agents via a web browser application. In either case, using the client software application, the agent can login to and access various resources of the cloud-based contact center. In some instances, the provider of the contact center platform may also publish or provide a software development kit ("SDK") that includes an application programming interface ("API") with various API calls that can be used to access various services of the cloud-based contact center platform. This allows each enterprise customer with the option of building its own client-based application, and integrating various services and functions provided by the platform with proprietary data and resources.

The presence service of the customer interaction system detects agent presence information in near real-time. For example, login and logout events are processed by the presence service to track changes in network connectivity that result from purposeful or explicit agent actions. The presence service receives and processes heartbeat messages, which originate at each client-side software application used by an agent. These heartbeat messages are sent from the client software application to the presence service on some predetermined scheduled (e.g., every 3, 5, or 10 seconds). These heartbeat messages are received and processed by the presence service, to track the online/offline status of an agent across multiple client devices and sessions. Accordingly, if an agent's client computing device somehow loses power or becomes disconnected from the cloud-based contact center platform, the client software application will discontinue sending heartbeat messages, and the presence service will infer a change in the agent's connectivity status. Because the heartbeat messages are monitored in a session-specific manner, an agent may be considered to be online via two client devices, simultaneously. When the agent logs off of the contact center platform via one client device, the presence system will update its intermediate records to reflect that the agent is no longer connected via one client device, but will maintain the online status of the agent, via a system of record, while the agent continues to be connected via the second client device.

The system or platform is referred to herein as a customer interaction system or a contact center system, and is described herein as facilitating communications between customers and agents. Those skilled in the art will readily recognize that, in various implementations, the platform itself may be referred to as something other than a contact center. For example, the platform may be referred to generally as a customer interaction system or service, or more simply as an interaction system or interaction service. Furthermore, in any given implementation or instance, the agent end-users and the customer end-users may be referred to in terms other than "agent" and "customer." For instance, an agent may be a representative of a company, but may also be a volunteer for an organization, and thus may be referred to by a variety of names other than "agent." Similarly, in many implementations, particularly when the customer interaction system is deployed by a traditional company that has customers, the customer end-users are properly referred to as "customers." However, in a variety of alternative implementations, the end-user may be generally known as and referred to by some name other than "customer." By way of example, an interaction system may be deployed for purposes of a political campaign, in which case the end-users may be referred to as voters. Similarly, in the context of a health care service, the end-users may be referred to as patients. In any of a number of other varied contexts, the end-users may have a different name by which they are generally referred. Other aspects and advantages of the various embodiments of the present invention will be readily apparent from the descriptions of the several figures that follows.

FIG. 1 is a diagram illustrating a network environment including a cloud-based contact center platform 100, consistent with embodiments of the invention. As illustrated in FIG. 1, the contact center platform 100, includes a presence service 102, and a user server 104. In an actual implementation, the contact center platform 100 may include a wide variety of other components (e.g., a web server and a router), which are generally beyond the scope of the present invention, and are thus, not shown or discussed in detail herein. In this example, the contact center platform 100 is a multichannel or omnichannel platform. As such, customers 106-A, 106-B and 106-C can initiate a customer interaction request via any of wide number of channels to include video, voice, SMS messaging, webchat, email, social media, and possibly others.

Consistent with some embodiments, each agent 108-A, 108-B and 108-C, will use a client computing device executing a client software application to access the contact center platform via a network 110. In some embodiments, the client software application may be a web browser application. However, in other examples, a custom software application may leverage code provided by the entity operating the contact center platform. Specifically, the code may be provided via an SDK having one or more APIs that a developer can leverage to develop a customer software application that can access the various services of the contact center platform 100.

When an agent 108-A is actively working, the agent 108-A will use the client software application to establish a network connection 112 with the contact center platform 100. For example, in the case of a web browser application, the client will enter a URL associated with the contact center platform 100, and a web server (not shown) of the contact center platform 100 will process a requested source document (e.g., a web page associated with the URL) and return to the web browser application an HTTP response that includes HTML, CSS, JavaScript, and other assets needed to render a web page at the web browser application. In some examples, the assets provided by the web server to the client software application will include software instructions, which, when processed at the client computing device, will cause the client computing device to generate and communicate, on some predetermined schedule or interval, heartbeat messages directed to a URL associated with the presence service 104. For instance, the client-side software instructions that cause the client to send the heartbeat messages may be a script in the JavaScript programming language, or some other language, where the heartbeat message is implemented as an HTTP Post request. Consistent with some examples, the request (e.g., the heartbeat message) will include at least a user identifier (ID) of the agent. However, in other instances, the request may also include, for example, an instance ID indicating the specific instance of the customer contact service being accessed by the agent, and an account ID indicating an enterprise customer account with which the agent and the agent's user ID are associated. When an agent logs off, an HTTP DELETE request is communicated to the presence service. The DELETE request will typically include fields (E.g., user ID, session ID, Instance ID, and possibly others) similar to the HTTP Post request.

As described in greater detail below, the presence service 102 receives and processes heartbeat messages in near real time and keeps track of the intermediate state of each network connection of an agent. However, when an official change in state is detected, the presence service 102 publishes a message to a queue of a streaming message distribution service (e.g., such as Kafka). The user service 104, which subscribes to receive messages published to the query, receives the published message, and performs an update of a database that represents the system of record. This database can be accessed by other services in the platform to obtain the official online or offline status of the agent.

Figure 2:
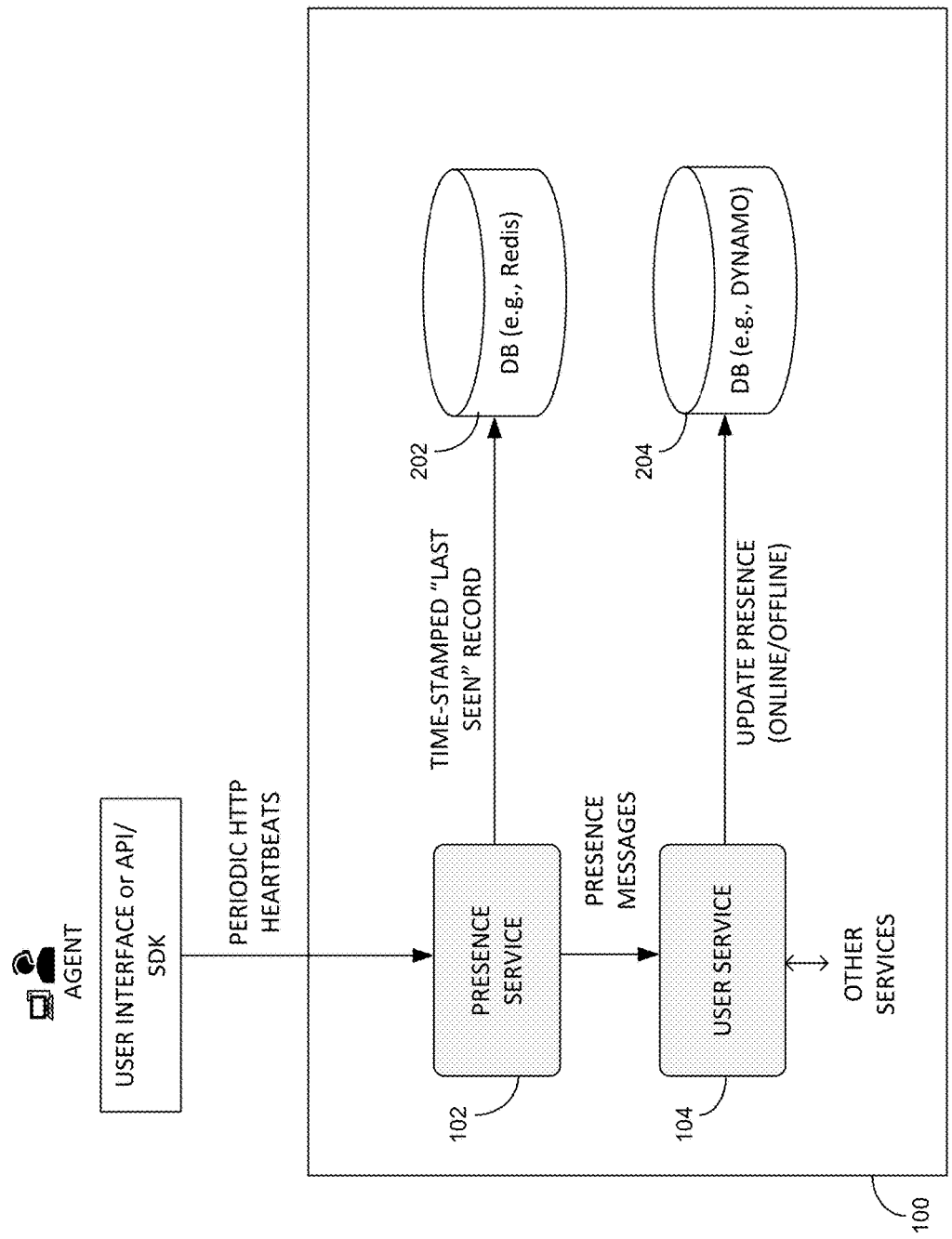
FIG. 2 is a system diagram illustrating an example of a presence system, according to one example.

FIG. 2 is a system diagram illustrating an example of a contact center platform 200 with a presence service 102, according to one example. As illustrated in FIG. 2, the presence service 102 operates in connection with a user service 104, to provide a near real-time connectivity status (e.g., online or offline) of each agent. The user service 104 is generally responsible for managing the presence status of each agent, by updating a database that serves as the system of record. The user service 104 updates the database in response to receiving messages published to a streaming message distribution service by the presence service 102. For example, as the presence service processes heartbeat messages and makes a determination that an agent is online, the presence service 102 will send a presence message to the user service, to inform the user service of any official changes to an agent's online/offline status. With some embodiments, the presence message sent from the presence service 102 to the user service 104 is communicated using HTTP. However, in other embodiments, the presence message may be communicated via a streaming message distribution service, such as Kafka. For instance, the presence service 102 will publish a message to a specific queue of a streaming message distribution service. The user service 104 is configured to receive messages, published to the queue in order of publication. The user service 104 will then process each received message by updating an associated record in a database that represents the system of record—that is, the official record-keeping service for tracking the online or offline status of each agent.

As illustrated in FIG. 2, the database 204 used by the user service 204 to persist the official presence status may be a cloud-based, key-value, NoSQL database, such as Dynamo—a service that is part of Amazon Web Services R, or AWS R. To retrieve the official presence status of an agent, various other services can make a call to an endpoint managed by the user service 104.

In order to detect implicit presence events, a "last seen" timestamp, based on the time at which a heartbeat message has been received, is stored for a brief duration. As additional heartbeat messages are received, representing activity of the same agent via the same session, the stored "last seen" timestamp is updated to reflect the time of the most recently received heartbeat message. One or more software processes executing in the background will periodically process the "last seen" timestamps to determine if a particular agent session has expired—that is, the delta between the current time and the time reflected by the timestamp has exceeded some predetermined threshold. When this occurs, the background process will "clean" up the temporary records maintained by the presence service, for example, by removing or deleting any record that is associated with the agent and session. The background process will also confirm whether the particular agent has any additional active sessions, and if not, the background process will publish an event message for processing by the user service 104, where the event message results in the user service 104 updating the official presence record for the agent to reflect that the agent is now offline.

Due to the high frequency of updates and the ephemeral nature of the heartbeat messages being processed by the presence service 102, a low latency data store 202 is preferred as it provides higher performance and scalability with lower costs than a persistent data store. Accordingly, with some embodiments, the data store 202 used by the presence service 102 may be a memory cache, such as ElastiCache for Redis.

Figure 3:
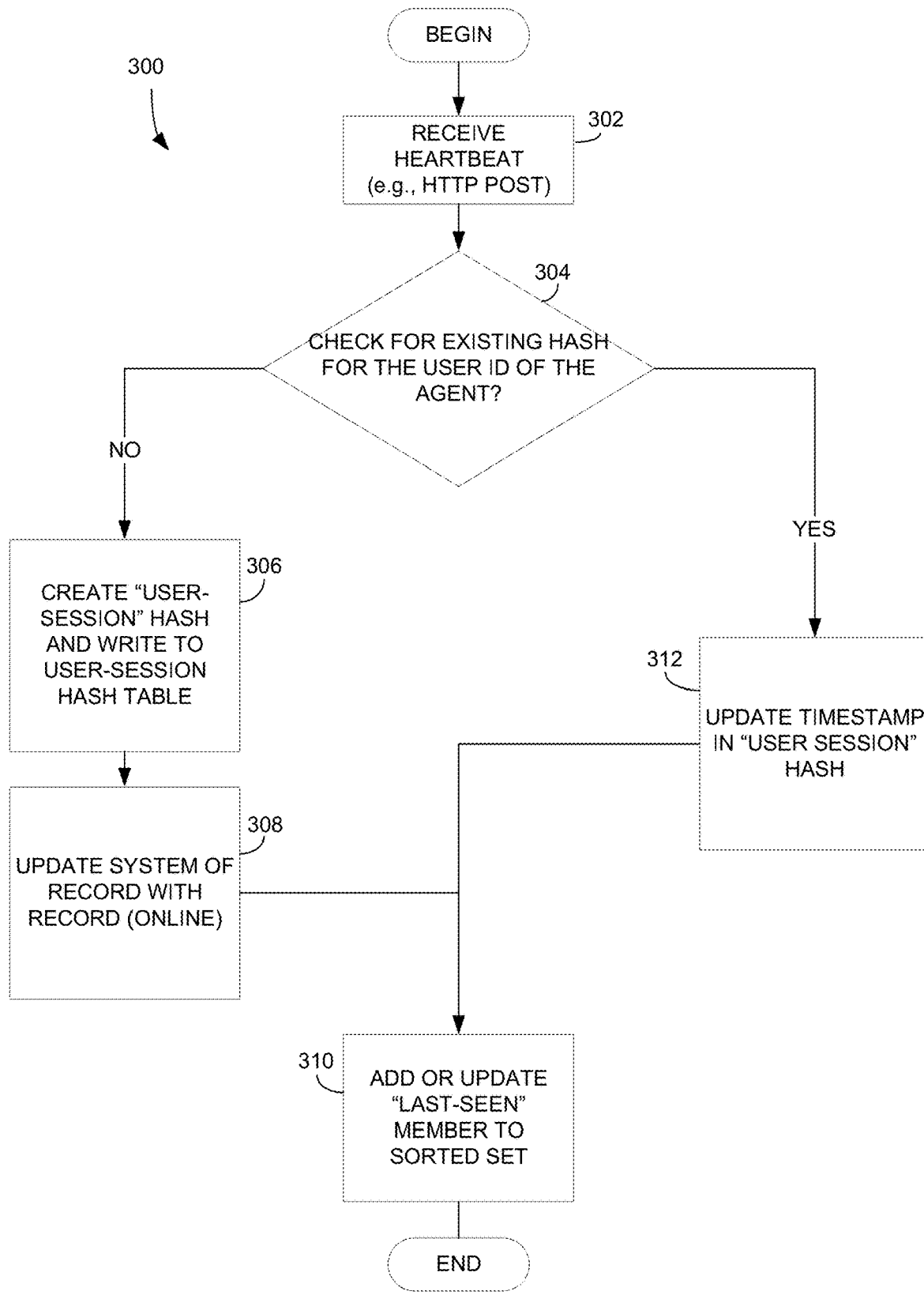
FIG. 3 is a flow diagram illustrating method operations performed by a presence service in processing a heartbeat message received from an application of a client computing device of an agent, according to one example.

FIG. 3 is a flow diagram illustrating operations performed by a presence service 102 in processing a heartbeat message received from a client software application of a client computing device of an agent, according to one example. At method operation 302, the presence service 102 receives, over a network connection, a first heartbeat message from a client software application executing at the client computing device of the agent. As described below, this heartbeat message may be the very first heartbeat message of a new session for the agent, where the agent has no other current sessions. Alternatively, the heartbeat message may be a second, third or subsequent heartbeat message for a current session. Finally, the heartbeat message may be a very first heartbeat message for a new session, where the agent has one or more other current or active sessions. In any case, the first heartbeat message is received at the presence service 102 as an HTTP Post request, that includes at least one data field indicating a user ID of the agent.

At method operation 304, the user presence service 102 performs a check to determine whether the newly received heartbeat message is a very first heartbeat message of a new session—for example, indicating a new login event—or alternatively, a subsequent heartbeat message for a previously established session. This is achieved by the presence service 102 determining if a hash for the user ID of the agent is presently in the memory cache. For instance, if the memory cache includes a hash for the user ID of the agent, this means the agent has already established a connection with the contact center platform. It may be the case that the heartbeat message is a subsequent heartbeat message for an existing session. Alternatively, the heartbeat message may be the first heartbeat message of a new session, where the agent already has an existing, active session. In any case, if no hash entry exists for the user ID of the agent, then the heartbeat message is construed to be the first heartbeat message of a new session, where the agent has no other current sessions.

At method operation 304, the presence service 102, after checking for the existence of a hash for the user ID of the agent in the memory cache, determines that there is no current hash in the memory cache for the user ID of the agent. Accordingly, at method operation 306, the presence service 102 creates a new hash for the user ID of the agent. The new hash created for the user ID of the agent will have a key, structured as a key-value pair, and a first entry, structured as a field-value pair. In this case, the key for the hash is the user ID (e.g., "user: <user_ID>"), where the value of the key is the value of the agent's user ID. However, in some alternative embodiments, the value for the key may be a combination of the agent's user ID and an instance ID, or an account ID, where the instance ID is for the instance of the contact center portal associated with the user ID, and the account ID is for the account associated with the user ID.

The first entry for the hash for the user ID is a field-value pair (e.g., "session: <guid>"), representing the active session—that is, the session, identified by a session ID, that is associated with the received heartbeat message. With some embodiments, the first entry in the hash will have a value that is a binary serialization of an object associated with the session, where the properties of the object will include at least a ("last seen") timestamp (e.g., based on, or derived using, a time at which the heartbeat message was received). Other properties may also be used, such as a device ID (uniquely identifying the client device from which the heartbeat message was received), an SDK version identifier, and so forth.

Once the hash for the user ID of the agent has been created and written to the memory cache (method operation 306), the presence service 102 will update the system of record to reflect that the agent is now online. Consistent with some embodiments, updating the system of record involves the presence service 102 publishing or posting a message to the user service. With some embodiments, this message may be published to a first queue (e.g., a topic queue) of a distributed streaming message service, such as Kafka. The published message includes at least the user ID of the agent. The user service 104, which subscribes to receive messages via the first queue (topic), receives and processes the published message. In some embodiments, the message communicated from the presence service to the user service may be communicated via HTTP (e.g., HTTP Post). In either case, when the user service receives the official presence message, the user service will process the message, for example, by writing (or updating) a data record in a cloud-based, key-value, NoSQL database, such as Dynamo-a service that is part of Amazon Web Services R, or AWSR. The data record written to the database is the official record, and can be used by other services (e.g., a router, for making routing decisions with respect to incoming customer interaction requests).

In addition to updating the system of record to reflect that the agent is online, at method operation 310, the presence service 102 stores a timestamp for the heartbeat message, which can later be compared against the current time to determine whether the agent's session has expired without a graceful exit (e.g., without the agent explicitly logging out). Accordingly, at method operation 310, the presence service 102 writes to the memory cache a member in a sorted set. Here, a sorted set is a collection of unique strings or members, sorted by a corresponding score. Accordingly, the member is comprised of a score and a value. The score is derived based on the timestamp associated with the heartbeat message. In some examples, the timestamp will be a UNIX epoch timestamp, or similar. The value of the member that is written to the sorted set will be the key of the hash for the user ID of the agent, and the session field. As described in greater detail below, a background process will periodically process the members within a sorted set to identify any agent sessions that have expired, but did not end gracefully—that is, based on the value of the score, the agent's client software application failed to send a heartbeat message within some prior, predetermined duration of time, indicating that a potential network connectivity problem has occurred.

The use of a sorted set in storing the "last seen" timestamp for the most recently received heartbeat message for each agent session is advantageous, as it allows the sorted set to be processed efficiently to identify any member in the sorted set that is associated with an expired agent session. For instance, because the members are ordered by their respective score, and because the score is based on the timestamp (e.g., UNIX epoch time, with some embodiments), the oldest members—that is, the members most likely to be associated with an expired agent session are accessed first. Furthermore, because of the overall volume of heartbeat messages that are being processed, with some embodiments, a number of sorted sets are provided so that the sorted sets can be processed in parallel. This prevents any one sorted set from having so many members that the processing of the sorted set becomes inefficient and takes too long. With some embodiments, when a "last seen" timestamp is being written to a sorted set, the presence system will select a particular sorted set by as a member to a sorted set may be written to a specific sorted set by an index number, where the index number is derived using a hash function to generate a hash value using as input the heartbeat message or a predetermined portion thereof, and then performing a modulus function on the hash value. The result is a number that can be used to select a sorted set to which the "last seen" timestamp for a given heartbeat message for an agent session is to be written.

Referring again to FIG. 3, if, at operation 304, upon checking the memory cache for a hash for the user ID of the agent, a determination is made that a hash for the user ID of the agent already exists, then at operation 312, the timestamp for the entry in the hash that corresponds with the session associated with the received heartbeat message is updated, to reflect the time at which the heartbeat message was received. For instance, when a hash entry already exists for a previously received heartbeat message for the same agent and session, the entry in the hash is updated by updating the value of the entry with data indicating the session (e.g., session ID) and data reflecting the new time— that is, the time when the most recent heartbeat message was received. Of course, if a hash exists only because the agent has an existing active session, different from the session associated with the most recently received heartbeat message, then instead of updating an entry in the hash with the most recent timestamp, the presence service 102 will add a new entry for the new session, in which case there will be two (or more) hash entries, with each one being associated with a unique session.

As shown in FIG. 3, after method operation 312, the presence service 102 will add or update the member in the sorted set representing the "last seen" timestamp for the agent and session. Although not shown in FIG. 3, upon completing the processing of the heartbeat message, the presence system will send an HTTP reply message to the client software application to indicate that the heartbeat message was successfully processed.

Figure 4:
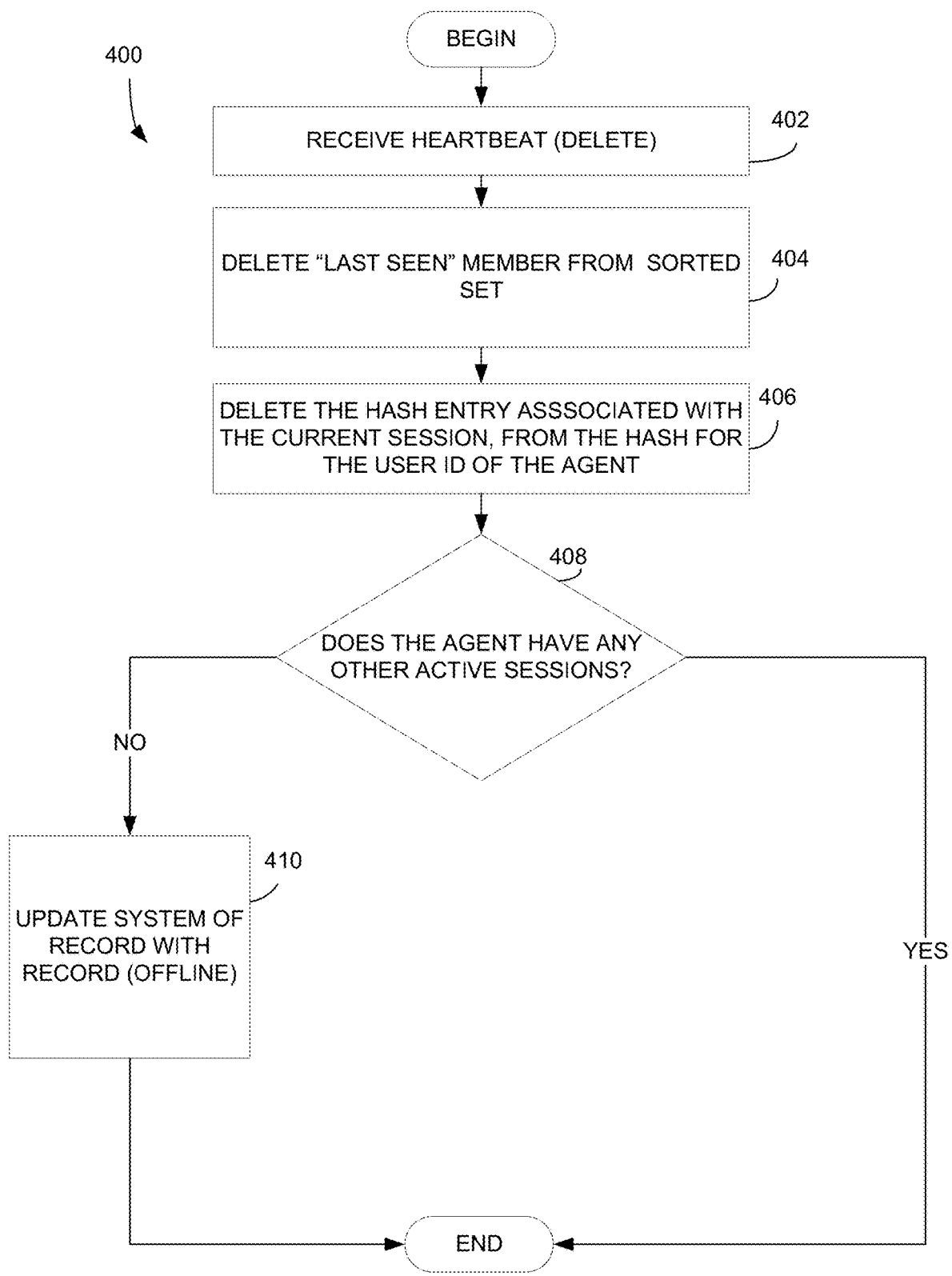
FIG. 4 is a flow diagram illustrating method operations performed by a presence service in processing a heartbeat message associated with an agent terminating a connection with a contact center platform, according to one example.

While FIG. 3 illustrates how a presence service 102 processes a heartbeat message received via an HTTP Post request-indicating that the agent's software application is currently maintaining an active network connection with the contact center platform, FIG. 4 is a flow diagram illustrating method operations performed by a presence service 102 in processing a heartbeat message, received via an HTTP DELETE request and associated with an agent terminating a connection with the contact center platform, according to one example. As shown in FIG. 4, the method 400 begins when, at operation 402, the presence service 102 receives an HTTP DELETE request, which includes at least one field indicating a user ID of an agent. The request may of course also include other fields, and in particular, a field identifying the session ID that was previously generated by the contact center platform 100 and provided to the client software application of the agent. The DELETE request may also include fields indicating an instance ID and/or an account ID.

At method operation 404, the presence service 102 deletes from the memory cache the member in the sorted set that is associated with the agent and session corresponding with the received HTTP DELETE request. As previously described, there may be a plurality of sorted sets that are being concurrently processed by a plurality of background processes. As such, in order to delete the member representing the "last-seen" heartbeat message for the agent and session from the sorted set, the presence service 102 may have to first make a claim to the sorted set, so as to lock access to the sorted set and prevent a possible race condition. This may be done, fore example, by writing a hash in the memory cache with an index number that identifies the sorted set that is being locked, after it has been successfully claimed. After updating the sorted set by deleting the member corresponding with the "last seen" timestamp for the agent and session, the hash used to lock or prevent access to the sorted set is deleted, allowing other processes to access the sorted set once again. This process is described in greater detail below in connection with the description of FIG. 5.

After deleting the member from the sorted set (operation 404), at method operation 406, the presence service 102 next deletes from the memory cache the hash entry associated with the session corresponding with the received HTTP DELETE request.

Then, at method operation 408, the presence service 102 makes a determination as to whether there are any other active sessions for the user ID of the agent. This may be done, for example, by querying the memory cache for any hash associated with the user ID of the agent. If there is no hash associated with the user ID of the agent, the presence system, at method operation 410, updates the system of record by publishing a message to a queue of the streaming message distribution service. In some embodiments, the message passing between the presence service 102 and the user service 104 may be accomplished via two separate queues, where each queue represents a different topic. Accordingly, when a message identifying an agent by user ID is received via a first queue, the user service updates the system of record to indicate that the agent is online, whereas when a message identifying an agent by user ID is received via a second queue—different from the first queue—the user service 104 updates the official presence record of the agent in the system of record by updating the presence status to indicate the agent is offline. If, at method operation 408, the presence system 102 determines that the agent has another active session, the presence system will simply reply to the client software application from which the DELETE request was received, to indicate successful processing of the request.

Figure 5:
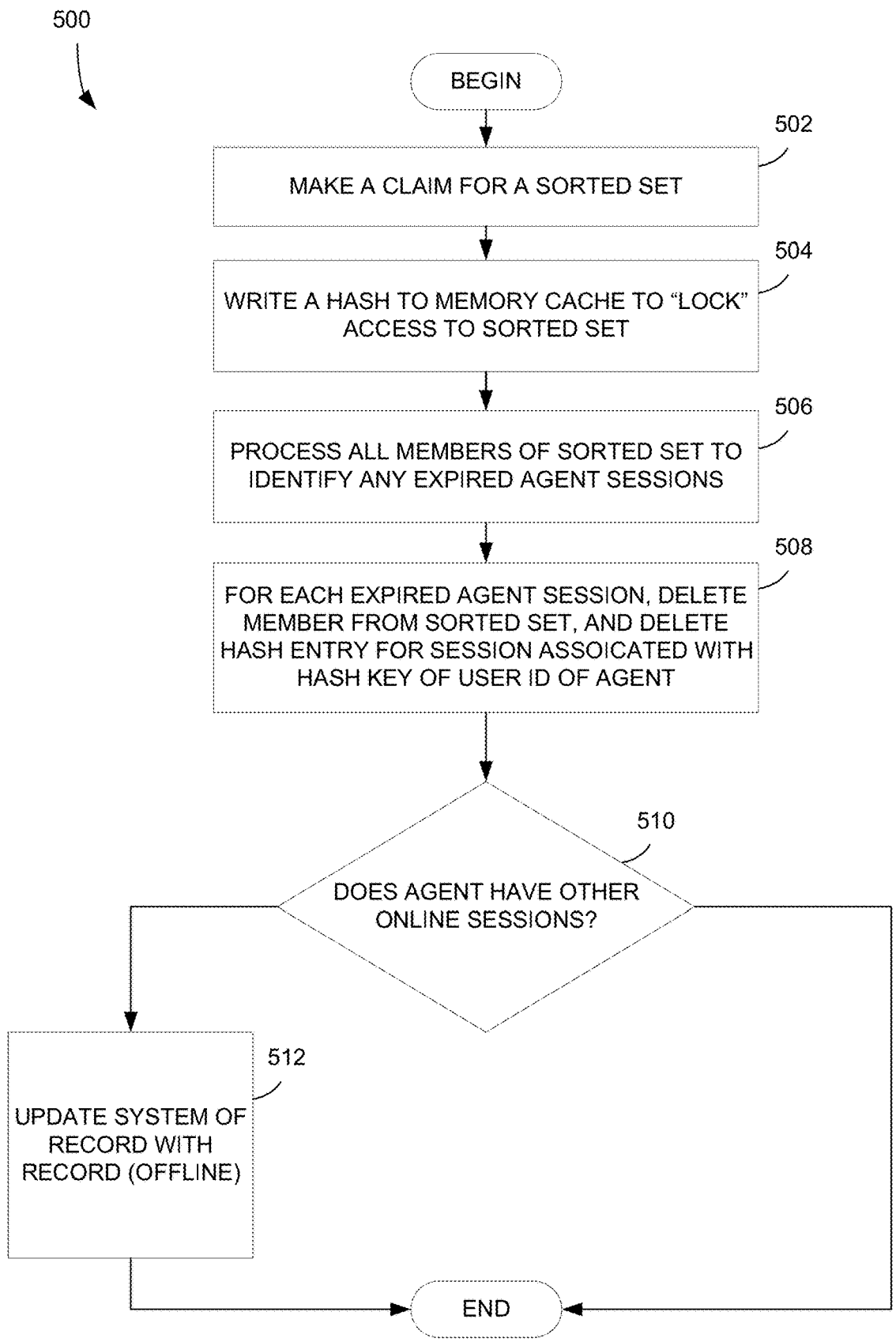
FIG. 5 is a flow diagram illustrating operations performed by a background process to check for, and cleanup, expired agent sessions, according to one example.

Referring now to FIG. 5, consistent with some embodiments, due to the extremely large volume of heartbeat messages that are being concurrently processed, the presence service 102 may be configured so that there are a plurality of sorted sets that can be processed in parallel by multiple background processes or separate threads, to determine if any agent session, represented as a member in a sorted set, has expired—for example, indicating an ungraceful logoff (e.g. the agent lost power or network connectivity, without explicitly logging off). Accordingly, with some embodiments, before the background process can access a sorted set, the background process must claim the sorted set for processing, to avoid a race condition.

FIG. 5 is a flow diagram illustrating operations performed by a background process to check for, and cleanup, expired agent sessions, according to one example. At method operation 502, a background process will attempt to make a claim for a sorted set. If successful, at method, operation 504, the background process will write a hash to the memory cache, indicating the identity of the sorted set to which the background process has successfully made a claim. This identifier of the sorted set may be the key for the set, and may be an index number, as described above. By writing the hash to lock access to the sorted set, a potential for a race condition—where two or more processes are attempting to access the same data at the same time—is prevented.

Next, at method operation 506, the background process, having claimed and locked a sorted set, will process the sorted set to identify any members representing agent sessions that have expired. Here, an agent session is considered to have expired if the duration of time that has passed from the current time, as reflected by the timestamp, exceeds some predetermined duration.

At method operation 508, the background process will delete the member from the sorted set for each member representing an expired agent session. Additionally, the background process will also delete any hash entry associated with the agent session.

Finally, at method operation 510, after deleting any hash or hash entry corresponding with an agent session for a user ID of an agent, the background process will determine if the particular agent has any other active sessions. When the agent has no other active sessions, as reflected at method operation 512, the background process will publish or post a message for the user service, so that the user service 104 can update the system of record to indicate that the agent is officially offline.

Machine Architecture

Figure 6:
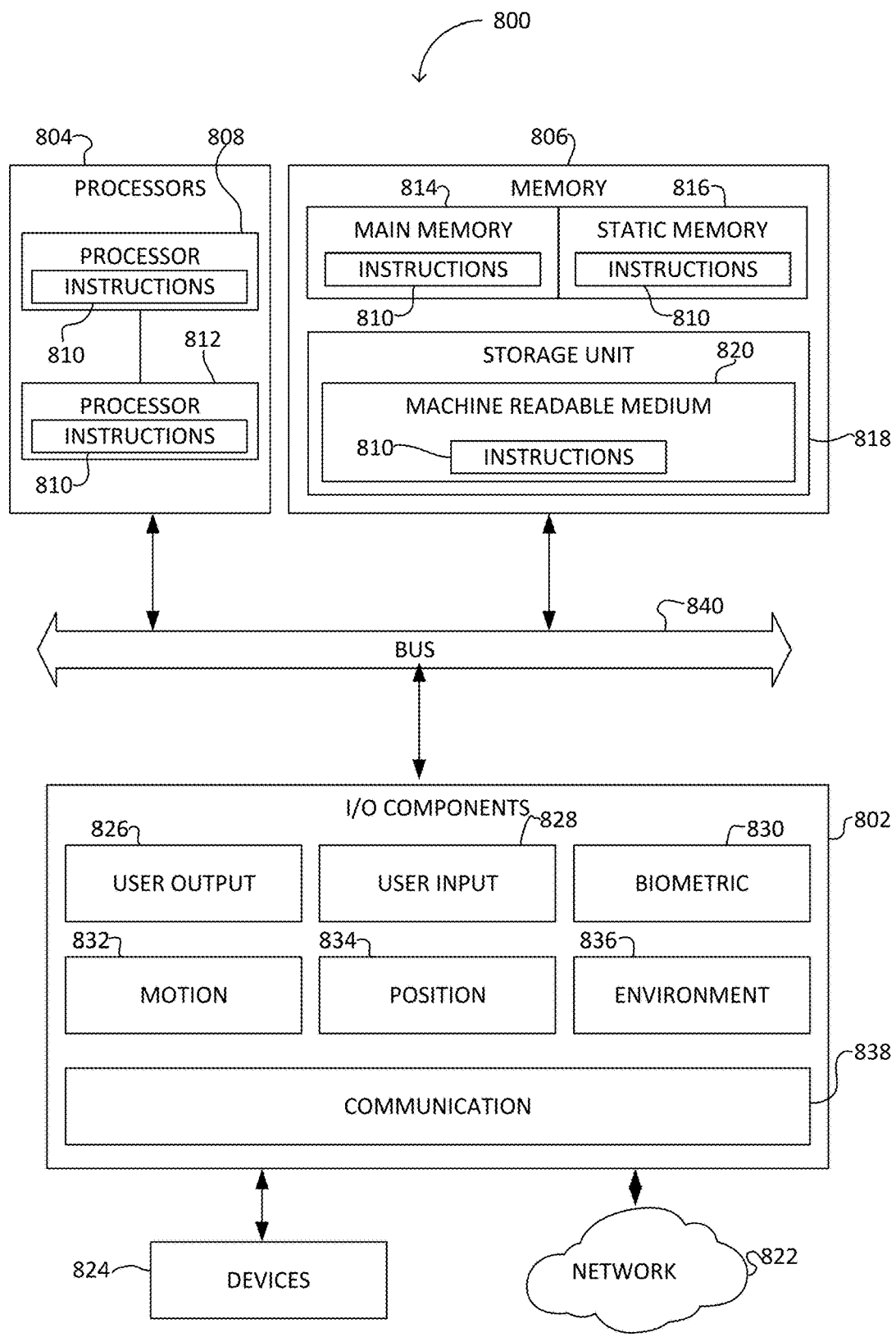
FIG. 6 is a diagrammatic representation of a computing device (e.g., a machine) within which instructions for causing the computing device to perform any one or more of the methodologies discussed herein may be stored and executed.

FIG. 6 is a diagrammatic representation of a machine 800—sometimes referred to as a computing device—within which instructions 810 (e.g., software, a program, an application or app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800) into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine (e.g., client computing device) in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while a single machine 800 is illustrated, the term "machine" shall also be taken to include a collection of machines that individually or jointly execute the instructions 810 to perform any one or more of the methodologies discussed herein. The machine 800, for example, may comprise the client machine(s) 310 or any one of multiple server devices forming part of presence or user services. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single core, a single processor with multiple cores (e.g., a multi-core processor), multiple processors with a single core, multiple processors with multiples cores, or any combination thereof.

The memory 806 includes a main memory 814, a static memory 816, and a storage unit 818, all accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 836, or position components 834, among a wide array of other components. The motion components 832 include acceleration sensor components (e.g., accelerometer), gravitation sensor components, rotation sensor components (e.g., gyroscope).

The environmental components 836 include, for example, one or more image sensors or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 7:
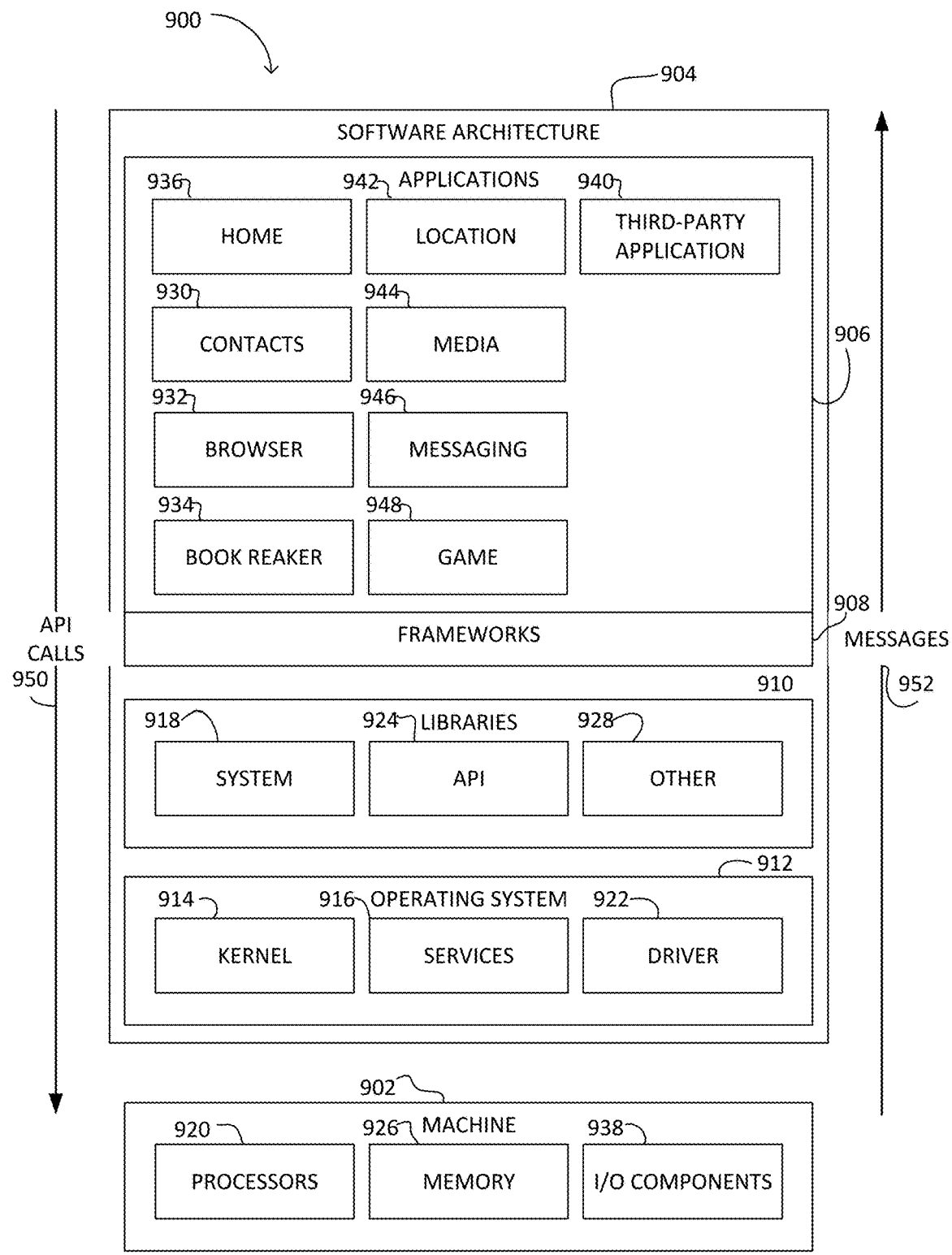
FIG. 7 is a block diagram illustrating a software architecture, which can be installed on any one or more of the devices described herein.

FIG. 7 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FIR drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionalities described herein.

We claim:

1. A system for monitoring network connectivity status of a user through a presence service, the system comprising:
a processor; and
a memory storage device storing instructions thereon, which, when executed by the processor, cause the system to perform operations comprising:
receiving over a network a first heartbeat message from a client application executing on a client device of a user, the first heartbeat message received as an HTTP Post request and including a user ID of the user;
determining if a hash for the user ID of the user is present in a memory cache; and
if the hash for the user ID of the user is determined to not be present in the memory cache:
writing to the memory cache a hash for the user ID, the hash for the user ID having a key structured as a key-value pair and a first entry structured as a field-value pair, wherein the value of the key is the user ID and the value of the first entry is data indicating a session ID associated with the first heartbeat message and a timestamp associated with the first heartbeat message; and
updating a database to include a data record indicating that the user is online; and
writing to the memory cache a member in a first sorted set of a plurality of sorted sets, the member comprising a score derived from the timestamp associated with the first heartbeat message and a value comprising the hash for the user ID and session ID, wherein the first sorted set is selected from the plurality of sorted sets using an index derived from the first heartbeat message;
wherein the plurality of sorted sets enable parallel processing to identify expired agent sessions based on the scores of the members.

2. The system of claim 1, wherein updating the database to include the data record indicating that the user is online comprises:
publishing, by the presence service, a message to a first queue of a distributed streaming message service, the message including the user ID of the user; and
processing, by a user service, the message published to the first queue by updating the data record in a cloud-based key-value NoSQL database, the data record indicating that the user is online.

3. The system of claim 1, further comprising:
receiving over the network a second heartbeat message from the client application executing on the client device of the user, the second heartbeat message received as an HTTP DELETE request and including the user ID of the user;
deleting from the memory cache the member in the first sorted set;
deleting from the memory cache the first entry of the hash for the user ID of the user;
determining that the hash for the user ID of the user has no additional entries; and
in response to determining that the hash for the user ID of the user has no additional entries, i) deleting from the memory cache the hash for the user ID of the user, and ii) updating the database to include a data record indicating that the user is offline.

4. The system of claim 3, wherein the first sorted set to which the member is written is selected from the plurality of sorted sets by using an index number associated with each sorted set in the plurality of sorted sets, the index number derived by using a hash function to generate a hash value using as input the first heartbeat message or a predetermined portion thereof, and then performing a modulus function on the hash value.

5. The system of claim 4, wherein the instructions cause the system to perform further operations comprising:
prior to writing to the memory cache the member in the first sorted set of the plurality of sorted sets, writing to the memory cache an entry for a claims hash, the entry structured as a field-value pair, wherein the value is the index number associated with the first sorted set.

6. The system of claim 5, further comprising:
writing to the memory cache an entry for the claims hash, the entry structured as a field-value pair, wherein the value is an index number of a sorted set in the plurality of sorted sets;
retrieving from the sorted set all members having a score associated with an expired session; and
for each member in the sorted set having a score associated with an expired session:
deleting an entry for a hash for a user ID, the entry identified by the value of the member;
determining if a hash identified by the value of the member has no entries; and
if the hash identified by the value is determined to have no entries:
deleting the hash from the cache memory; and
updating the database to include a data record indicating that the user is offline.

7. The system of claim 1, wherein the instructions cause the system to perform further operations comprising:
subsequent to determining if the hash for the user ID of the user is present in the memory cache;
if the hash for the user ID of the user is determined to be present in the memory cache:
updating a value of an existing entry in the hash for the user ID of the user with data indicating a session ID associated with the first heartbeat message and a timestamp associated with the first heartbeat message, if a current value of the existing entry includes data indicating the session ID associated with the first heartbeat message.

8. The system of claim 1, wherein the instructions cause the system to perform further operations comprising:
subsequent to determining if the hash for the user ID of the user is present in the memory cache;
if the hash for the user ID of the user is determined to be present in the memory cache:
determining that there is no entry in the hash for the user ID of the user having a value with data indicating a session ID that corresponds with a session ID associated with the first heartbeat message; and
responsive to determining that there is no entry in the hash for the user ID of the user having a value with data indicating a session ID that corresponds with a session ID associated with the first heartbeat message, writing to the memory cache a new entry for the hash for the user ID, the new entry structured as a field-value pair, wherein the value of the new entry is data indicating a session ID associated with the first heartbeat message and a timestamp associated with the first heartbeat message.

9. A computer-implemented method for monitoring network connectivity status of a user through a presence service, the method comprising:
   receiving over a network a first heartbeat message from a client application executing on a client device of an user, the first heartbeat message received as an HTTP Post request and including a user ID of the user;
   determining if a hash for the user ID of the user is present in a memory cache; and
   if the hash for the user ID of the user is determined to not be present in the memory cache:
   writing to the memory cache a hash for the user ID, the hash for the user ID having a key structured as a key-value pair and a first entry structured as a key-value pair, wherein the value of the key is the user ID and the value of the first entry is data indicating a session ID associated with the first heartbeat message and a timestamp associated with the first heartbeat message; and
   updating a database to include a data record indicating that the user is online; and
   writing to the memory cache a member in a first sorted set of a plurality of sorted sets, the member comprising a score derived from the timestamp associated with the first heartbeat message and a value comprising the hash for the user ID and session ID, wherein the first sorted set is selected from the plurality of sorted sets using an index derived from the first heartbeat message;
   wherein the plurality of sorted sets enable parallel processing to identify expired agent sessions based on the scores of the members.

10. The computer-implemented method of claim 9, wherein updating the database to include the data record indicating that the user is online comprises:
    posting, by a presence service, a message to a user service, the message including the user ID of the user; and
    processing, by the user service, the posted message by updating the data record in a cloud-based key-value NoSQL database, the data record indicating that the user is online.

11. The computer-implemented method of claim 9, further comprising:
    receiving over the network a second heartbeat message from the client application executing on the client device of the user, the second heartbeat message received as an HTTP DELETE request and including the user ID of the user;
    deleting from the memory cache the member in the first sorted set;
    deleting from the memory cache the first entry of the hash for the user ID of the user;
    determining that the hash for the user ID of the user has no additional entries; and
    in response to determining that the hash for the user ID of the user has no additional entries, i) deleting from the memory cache the hash for the user ID of the user, and ii) updating the database to include a data record indicating that the user is offline.

12. The computer-implemented method of claim 11, wherein the first sorted set to which the member is written is selected from the plurality of sorted sets by using an index number associated with each sorted set in the plurality of sorted sets, the index number derived by using a hash function to generate a hash value using as input the first heartbeat message or a predetermined portion thereof, and then performing a modulus function on the hash value.

13. The computer-implemented method of claim 12, further comprising:
    prior to writing to the memory cache the member in the first sorted set of the plurality of sorted sets, writing to the memory cache an entry for a claims hash, the entry structured as a key-value pair, wherein the value is the index number associated with the first sorted set.

14. The computer-implemented method of claim 13, further comprising:
    writing to the memory cache an entry for the claims hash, the entry structured as a key-value pair, wherein the value is an index number of a sorted set in the plurality of sorted sets;
    retrieving from the sorted set all members having a score associated with an expired session; and
    for each member in the sorted set having a score associated with an expired session:
    deleting an entry for a hash for a user ID, the entry identified by the value of the member;
    determining if a hash identified by the value of the member has no entries; and
    if the hash identified by the value is determined to have no entries:
    deleting the hash from the cache memory; and
    updating the database to include a data record indicating that the user is offline.

15. The computer-implemented method of claim 9, further comprising:
    subsequent to determining if the hash for the user ID of the user is present in the memory cache;
    if the hash for the user ID of the user is determined to be present in the memory cache:
    updating a value of an existing entry in the hash for the user ID of the user with data indicating a session ID associated with the first heartbeat message and a timestamp associated with the first heartbeat message, if a current value of the existing entry includes data indicating the session ID associated with the first heartbeat message.

16. The computer-implemented method of claim 9, further comprising:
    subsequent to determining if the hash for the user ID of the user is present in the memory cache:
    if the hash for the user ID of the user is determined to be present in the memory cache:
    determining that there is no entry in the hash for the user ID of the user having a value with data indicating a session ID that corresponds with a session ID associated with the first heartbeat message; and
    responsive to determining that there is no entry in the hash for the user ID of the user having a value with data indicating a session ID that corresponds with a session ID associated with the first heartbeat message, writing to the memory cache a new entry for the hash for the user ID, the new entry structured as a key-value pair, wherein the value of the new entry is data indicating a session ID associated with the first heartbeat message and a timestamp associated with the first heartbeat message.

17. A system for monitoring network connectivity status of a user through a presence service, the system comprising:
    means for receiving over a network a first heartbeat message from a client application executing on a client device of an user, the first heartbeat message received as an HTTP Post request and including a user ID of the user;

means for determining if a hash for the user ID of the user is present in a memory cache; and if the hash for the user ID of the user is determined to not be present in the memory cache:

means for writing to the memory cache a hash for the user ID, the hash for the user ID having a key structured as a key-value pair and a first entry structured as a field-value pair, wherein the value of the key is the user ID and the value of the first entry is data indicating a session ID associated with the first heartbeat message and a timestamp associated with the first heartbeat message; and means for updating a database to include a data record indicating that the user is online; and means for writing to the memory cache a member in a first sorted set of a plurality of sorted sets, the member comprising a score derived from the timestamp associated with the first heartbeat message and a value comprising the hash for the user ID and session ID, wherein the first sorted set is selected from the plurality of sorted sets using an index derived from the first heartbeat message;

wherein the plurality of sorted sets enable parallel processing to identify expired agent sessions based on the scores of the members.

18. The system of claim 17, wherein updating the database to include the data record indicating that the user is online comprises:

means for posting, by the presence service, a message to a user service, the message including the user ID of the user; and means for processing, by the user service, the posted message by updating the data record in a cloud-based key-value NoSQL database, the data record indicating that the user is online.

\* \* \* \* \*